(No Model.)
G. BETTINI.
APPARATUS FOR THE RECORD AND REPRODUCTION OF SOUNDS.
No. 409,005. Patented Aug. 13, 1889.
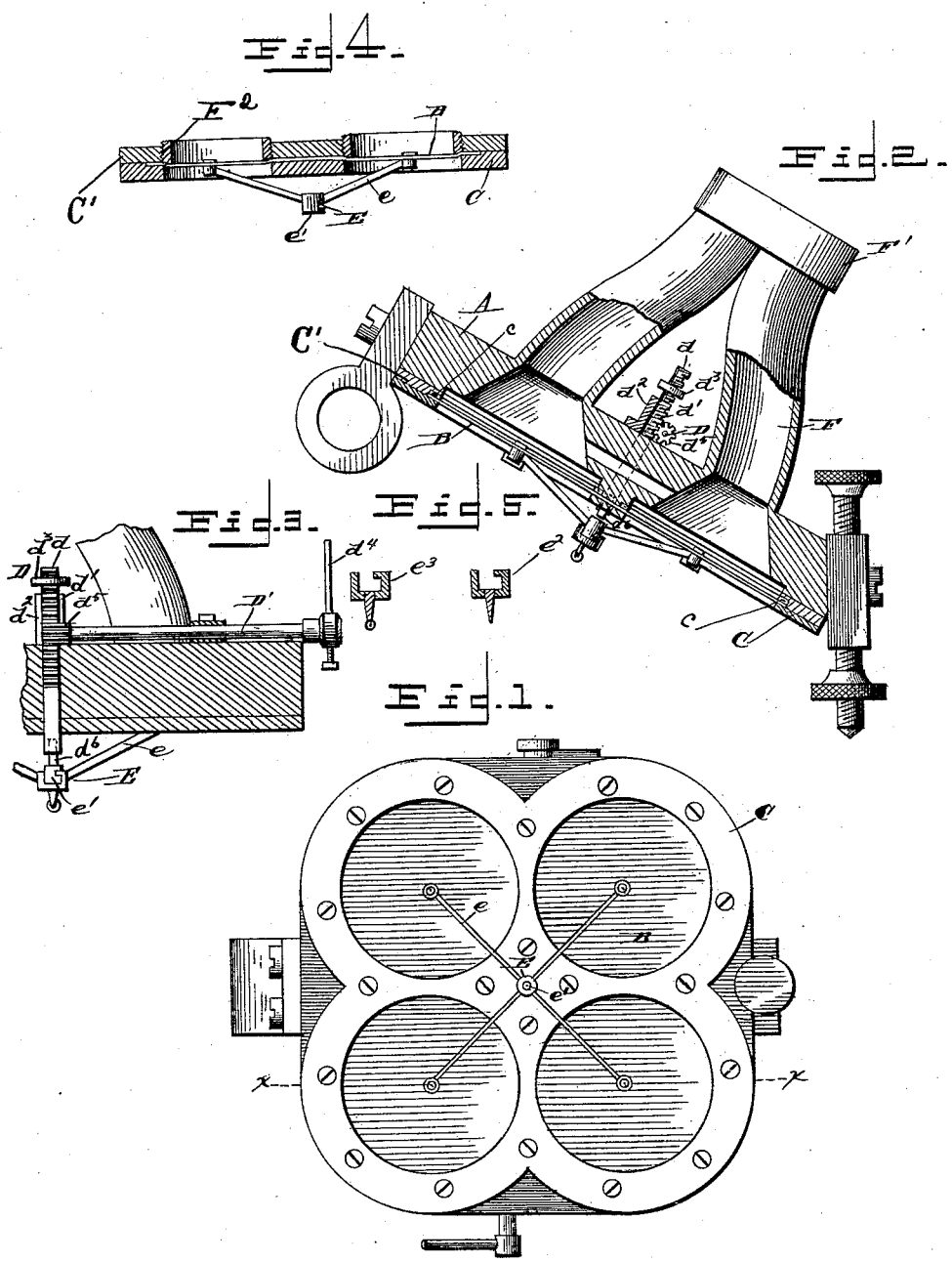

UNITED STATES PATENT OFFICE.

GIANNI BETTINI, OF NEW YORK, N. Y.

APPARATUS FOR THE RECORD AND REPRODUCTION OF SOUNDS.

SPECIFICATION forming part of Letters Patent No. 409,005, dated August 13, 1889.

Application filed April 20, 1889. Serial No. 308,029. (No model.)

*To all whom it may concern:*

Be it known that I, GIANNI BETTINI, a subject of the King of Italy, and a resident of New York, county and State of New York, have invented certain new and useful Improvements in Means for the Record and Reproduction of Articulate and other Sounds; and I do hereby declare the following to be a full, clear, and exact description of the invention, such as will enable others skilled in the art to which it appertains to make and use the same.

This invention relates to the record and reproduction of articulate or other sound or sounds.

The object of the invention is to produce means whereby articulate or other sound or sounds may readily be recorded and be reproduced with the greatest amplitude and distinctness.

With this object in view the invention resides in an apparatus comprising a diaphragm or other body capable of vibration and having different parts thereof under separate uniform tension, and a vibration-conductor consisting of a body having a common or central point or place, at which point is attached a projection, wheel, or the like, designed to make a record of vibrations at one operation and to pass over a record of vibrations at another operation, and arms or projections one or more of which bear upon each of the divisions of the diaphragm or other body.

The invention consists, furthermore, in an apparatus comprising a diaphragm or other body capable of vibrating having different divisions or parts thereof under separate uniform tension, two or more preferably resonant chambers arranged in communication with a vibrating body, a tube or tubes forming an inlet to or outlet from the chambers, and a vibration-conductor bearing upon or attached to one or more points on each division or part of the diaphragm or other vibrating body, and converging to a common or central point or focus, at which point is placed a projection designed to impress a record of vibrations upon a soft or yielding body, and to pass over such record and reproduce the vibrations, and, finally, the invention resides in various novel details of construction whereby the objects of the invention are attained.

I have illustrated the invention in the accompanying drawings, in which—

Figure 1 represents an inverted plan view of an apparatus constructed in accordance with my invention. Fig. 2 represents a sectional view of the same on the line $xx$ of Fig. 1. Fig. 3 represents a sectional view of a portion of the apparatus, the section being then at right angles to that illustrated in Fig. 2. Fig. 4 is a sectional view of a modified construction of the means for retaining the diaphragm in place and imposing tension thereon. Fig. 5 represents a point and wheel designed, respectively, to make and pass over a record.

In the drawings, A represents the body of the apparatus to which the operative parts are attached, and having in its interior two or more resonant chambers. One side of each of these chambers is formed by the diaphragm or other vibrating body B. The diaphragm is sustained between two plates C C′, which are screwed together and attached to the main portion A.

The plates C C′, between which the diaphragm is interposed, are bound together by screw or other pressure, which is uniform throughout, and, as the plates or frames each have openings corresponding to the form of the resonant chambers, a construction in which there are a number of diaphragms each under separate and uniform tension corresponding to the number of chambers is produced. By this construction there are formed practically a number of independent diaphragms, with the advantage that uniformity of thickness of the different divisions is secured by making all of the same diaphragm or body.

In order that the vibrations of the diaphragm may not be communicated to the plate C′, and in order that the tension on all parts of the diaphragm may be uniform, I interpose between the edges of the diaphragm and this plate a rubber gasket or packing $c$.

In Fig. 4 of the drawings I have illustrated a modified form of device for retaining and imposing tension upon the divisions or parts of the diaphragm. In this form the frame or plate C′ is provided with rings $F^2$, having screw-threads on their exterior entering corresponding screw-threads in the frame or plate C'. The lower edges of these rings bear upon the diaphragm, when in position, between the plates C and C', so that by turning the rings to bring them to bear more or less on the diaphragm the tension of the separate divisions may be changed independently.

Bearing upon or attached to the exposed face of the diaphragm is a spider E, having any desired or practical number of projecting arms or branches e, one or more of which bear upon each of the divisions of the diaphragm. These arms converge to a common point $e'$, slightly removed from the diaphragm, and at this place or focus I provide means—such as a bayonet-joint—for attaching a projection $e^2$ or a projection $e^3$, bearing a small wheel, as desired. The projection is designed to receive vibrations from the diaphragm or other vibrating body through the arms and impart them to a suitable body of soft or yielding material for making a record, and a wheel at the end of the projection is designed to pass over the record made in this way or in any other suitable way, and impart the same or nearly the same vibrations to the diaphragm, causing sound-waves corresponding to and nearly equal in amplitude and character to those initially causing the vibrations in the diaphragm.

Heretofore it has been necessary to employ two independent diaphragms in apparatus for recording and reproducing sound, one for making the record and one for reproducing the sounds. The elasticity of the diaphragm for reproducing the sounds has always been greater than that of the one which makes the record, in order that the resistance of the reproducing-diaphragm be less than that of the material in which the record is made, avoiding injury to the record. When it is attempted to use the reproducing-diaphragm to make a record, it is found that the bringing of the stylus or the like into contact with the material in which the record is to be made results in the upward movement of this portion of the diaphragm at which the stylus or point is attached. This acts as a damper at this point and prevents the perfect communication of the vibrations to the record.

In order that I may use one diaphragm and its attachments both for making a record of sounds and for reproducing sound from such record, I employ an adjustable device—such as that illustrated by the letter D—for giving rigidity to the diaphragm in making a record. This consists, essentially, of the bar or pin $d$, screw-threaded at its upper end, and also provided with a rack $d'$.

Upon the upper face of the portion A is a post or projection $d^2$, and upon the bar or pin $d$ is a screw-collar or ring $d^3$, capable of being moved up and down upon the bar or pin $d$, and by striking against the post or projection limiting the downward movement of the pin or bar and in this way determining the pressure which the pin imposes upon the spider. The movement up and down of the pin is accomplished by the shaft D', which extends from the center to the edge of the frame. At its outer end the shaft is provided with a lever $d^4$, by which it may be rotated, and through the pinion $d^5$, at its inner end, engage the rack on the pin or bar $d$, imparting motion to the pin. The lower end of the pin $d$ is provided with a small piece of rubber or other suitable material $d^6$, designed to bear on the portion $e'$ of the spider when the bar is in its downward position, and which will effectually prevent passage of vibrations from the spider to the pin $d$. When it is desired to use the diaphragm to make a record, the pin $d$ is moved down to bring its lower end to bear on the spider, the adjustable collar having been previously so placed as to allow the proper movement of the pin to bring it to a position to prevent any upward movement of the diaphragm, should the resistance of the material in which the record is to be made be greater than that of the diaphragm. During the use of the diaphragm for reproducing sound the pin is removed entirely from contact with the spider, allowing the free vibrations in all parts of the diaphragm.

From each of the chambers extend tubes or conveyers F, containing air or other suitable fluid in which waves are caused by the vibrations existing in the diaphragm, or by sound-waves caused by articulation or other sound or sounds. The tubes converge to a common point F', where I attach, during the formation of a record, a speaking-tube for conveying sound to the fluid in the independent tubes, and from this fluid imparting vibrations to the diaphragm. When reproduction takes place, I preferably place a funnel-shaped attachment in lieu of the speaking-tube, whereby the sounds emanating from the vibrations of the diaphragm from the different chambers are collected from the tubes or conveyers and are caused to unite, thus obtaining greater amplitude of the sound.

Having thus fully described my invention, what I claim as new, and desire to secure by Letters Patent, is—

1. An apparatus for recording and reproducing articulate and other sound or sounds, comprising a diaphragm or other body capable of vibration, and having different parts thereof under a separate uniform tension, and a vibration-conductor consisting of a body having a common or central point or place, at which point is placed a projection designed to make a record, and arms or projections extending from the central point and bearing upon each of the divisions of the diaphragm.

2. An apparatus for recording and reproducing articulate and other sound or sounds, comprising a diaphragm or other body capable of vibration, having different divisions or parts thereof under separate uniform tension, two or more resonant chambers arranged in communication with a vibrating body, and a vibration-conductor comprising arms or projections, one or more of which bear upon each of the divisions of the diaphragm, and which converge to a common or central point, and a projection attached at this common or central point and designed to make a record, or to pass over a record already made, substantially as described.

3. An apparatus for recording and reproducing articulate and other sound or sounds, comprising a diaphragm or other body having different parts or divisions thereof under separate and uniform tension, two or more resonant chambers communicating with the diaphragm or other vibrating body, and a tube or tubes forming an inlet or an outlet from the chambers, and a vibration-conductor comprising arms or projections, one or more of which bear upon each division of the diaphragm or other vibrating body, and converge to a common or central point, and a projection attached at this point, substantially as described.

4. An apparatus for recording and reproducing articulate and other sound or sounds, comprising a diaphragm or other body capable of vibration, a vibration-conductor comprising arms or projections bearing upon or attached to the diaphragm, and an adjustable pin or projection from the frame containing the diaphragm, capable of movement to bring it in contact with or away from the vibration-conductor.

In testimony whereof I affix my signature in presence of two witnesses.

GIANNI BETTINI.

Witnesses:
ORAZIO LUGO,
F. B. KEEFER.